US011961244B2

(12) United States Patent
Zuo et al.

(10) Patent No.: US 11,961,244 B2
(45) Date of Patent: Apr. 16, 2024

(54) HIGH-PRECISION DYNAMIC REAL-TIME 360-DEGREE OMNIDIRECTIONAL POINT CLOUD ACQUISITION METHOD BASED ON FRINGE PROJECTION

(71) Applicant: NANJING UNIVERSITY OF SCIENCE AND TECHNOLOGY, Jiangsu (CN)

(72) Inventors: Chao Zuo, Nanjing (CN); Jiaming Qian, Nanjing (CN); Qian Chen, Nanjing (CN); Shijie Feng, Nanjing (CN); Tianyang Tao, Nanjing (CN); Yan Hu, Nanjing (CN); Wei Yin, Nanjing (CN); Liang Zhang, Nanjing (CN); Kai Liu, Nanjing (CN); Shuaijie Wu, Nanjing (CN); Mingzhu Xu, Nanjing (CN); Jiaye Wang, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 17/769,230

(22) PCT Filed: Aug. 27, 2020

(86) PCT No.: PCT/CN2020/111545
§ 371 (c)(1),
(2) Date: Apr. 14, 2022

(87) PCT Pub. No.: WO2021/088481
PCT Pub. Date: May 14, 2021

(65) Prior Publication Data
US 2024/0037765 A1 Feb. 1, 2024

(30) Foreign Application Priority Data
Nov. 8, 2019 (CN) .......................... 201911089522.2

(51) Int. Cl.
*H04N 23/90* (2023.01)
*G06T 3/14* (2024.01)
(Continued)

(52) U.S. Cl.
CPC ................ *G06T 7/337* (2017.01); *G06T 3/14* (2024.01); *G06T 7/85* (2017.01); *H04N 23/90* (2023.01);
(Continued)

(58) Field of Classification Search
CPC .... H04N 13/254; H04N 13/271; H04N 23/51; H04N 23/57; H04N 23/62; H04N 23/63;
(Continued)

(56) References Cited

U.S. PATENT DOCUMENTS

2019/0068954 A1  2/2019  Lacaze et al.

FOREIGN PATENT DOCUMENTS

CN  102288131 A  * 12/2011
CN  107240067 A  * 10/2017
(Continued)

OTHER PUBLICATIONS

International Search Report for PCT/CN2020/111545 dated Nov. 6, 2020.

*Primary Examiner* — Masum Billah
(74) *Attorney, Agent, or Firm* — Birch, Stewart, Kolasch & Birch, LLP (57) ABSTRACT

Disclosed is a high-precision dynamic real-time 360-degree omnidirectional point cloud acquisition method based on fringe projection. The method comprises: firstly, by means of the fringe projection technology based on a stereoscopic phase unwrapping method, and with the assistance of an adaptive dynamic depth constraint mechanism, acquiring high-precision three-dimensional (3D) data of an object in real time without any additional auxiliary fringe pattern; and
(Continued)

then, after a two-dimensional (2D) matching points optimized by the means of corresponding 3D information is rapidly acquired, by means of a two-thread parallel mechanism, carrying out coarse registration based on Simultaneous Localization and Mapping (SLAM) technology and fine registration based on Iterative Closest Point (ICP) technology. By means of the invention, low-cost, high-speed, high-precision, unconstrained and rapid-feedback omnidirectional 3D real-time molding becomes possible, and a new gate is opened into the fields of 360-degree workpiece 3D surface defect detection, rapid reverse forming, etc.

5 Claims, 3 Drawing Sheets

(51) Int. Cl.
*G06T 7/33* (2017.01)
*G06T 7/80* (2017.01)

(52) U.S. Cl.
CPC ............... *G06T 2207/10012* (2013.01); *G06T 2207/10028* (2013.01)

(58) Field of Classification Search
CPC .... H04N 23/631; H04N 23/661; H04N 7/185; G01B 11/2536; G01B 11/2545; G06T 7/521; G06T 11/003
USPC ......................................................... 348/48
See application file for complete search history.

(56) References Cited

FOREIGN PATENT DOCUMENTS

| | | | |
|---|---|---|---|
| CN | 110044301 A | 7/2019 | |
| CN | 110880185 A | 3/2020 | |
| WO | WO-2007061632 A2 * | 5/2007 | ......... G01B 11/2536 |

* cited by examiner

HIGH-PRECISION DYNAMIC REAL-TIME 360-DEGREE OMNIDIRECTIONAL POINT CLOUD ACQUISITION METHOD BASED ON FRINGE PROJECTION

TECHNICAL FIELD

The invention belongs to the technical field of three-dimensional imaging, in particular to a high-precision dynamic real-time 360° omnidirectional point cloud acquisition method based on fringe projection.

BACKGROUND TECHNIQUE

In recent years, non-contact three-dimensional (3D) surface measurement technology has been widely used in many fields, such as industrial inspection, cultural relics protection, reverse modeling, human-computer interaction, etc. (J. Salvi, S. Fernandez, T. Pribanic, and X. Llado, *Pattern recognition* 43, 2666 (2010)). Among many 3D imaging technologies, fringe projection technology (FPP) has become one of the most popular 3D imaging technologies due to its high measurement accuracy, simple hardware facilities, and easy implementation (J. Geng, Adv. Opt. Photonics 3, 128 (2011)). Currently, most researches on FPP focus on 3D measurements from a single viewing angle (S. Zhang, Opt. Lasers Eng. 48, 149 (2010)). However, in applications such as industrial inspection and reverse modeling, it is necessary to obtain the full 3D model of the object. However, the traditional FPP system cannot obtain a complete 3D model of the object in one measurement due to its limited field of view. To obtain the full 3D topography, the 3D data of the object needs to be scanned from multiple viewpoints.

In order to acquire and align the 3D topography data of objects from different viewpoints, auxiliary instruments are usually needed for the registration of point cloud data (X. Liu, X. Peng, H. Chen, D. He, and B. Z. Gao, *Opt. letters* 37, 3126 (2012); M. Nießner, M. Zollhöfer, S. Izadi, and M. Stamminger, ACM Transactions on Graph. (ToG) 32, 169 (2013); B. Chen and B. Pan, *Measurement* 132, 350 (2019)). Common auxiliary devices include rotating platforms, robotic arms, and flat mirrors. Through the coordinate relationship between the rotation axis of the rotating platform and the imaging system, the point cloud data from multiple viewing angles can be converted into the same coordinate system. However, the turntable system can only obtain the 3D data of the object in the vertical direction of the rotation axis, and it is difficult to obtain the information of the top and bottom of the object (X. Liu, X. Peng, H. Chen, D. He, and B. Z. Gao, *Opt. letters* 37, 3126 (2012)). Using the robotic arm, it is possible to obtain more 3D information from the perspective by presetting its movement path (M. Nießner, M. Zollhöfer, S. Izadi, and M. Stamminger, ACM Transactions on *Graph.* (ToG) 32, 169 (2013)). But the cost of robotic arms is high, and robotic arm-based systems require complex hardware connections, making it extremely difficult to implement such a system. A measurement system with two mirrors can reconstruct the panoramic 3D information of an object in one measurement because the system can simultaneously capture the 3D topography of the object from three different viewpoints (B. Chen and B. Pan, *Measurement* 132, 350 (2019)). However, such systems still cannot achieve full 3D measurements due to limited angular information.

Due to expensive hardware facilities, complex structures and limited angle information, the above-mentioned instrument-assisted 3D registration methods are not ideal methods to obtain 360° omnidirectional 3D models. The ideal way is to arbitrarily rotate the object to obtain 3D data at enough viewing angles, while performing real-time 3D registration sequentially. However, there are two major technical difficulties in this method: (1) Due to the limitations of hardware technology and real-time algorithms, it is difficult to build a real-time high-precision 3D measurement system based on FPP for dynamic objects (J. Qian, T. Tao, S. Feng, Q. Chen, and C. Zuo, *Opt. express* 27, 2713 (2019)); (2) Uninterrupted real-time high-precision 3D registration without auxiliary instruments is very challenging (S. Kahn, U. Bockholt, A. Kuijper, and D. W. Feltner, Comput. *Industry* 64, 1115 (2013)). In 2002, Rusinkiewicz et al. (S. Rusinkiewicz, O. Hall-Holt, and M. Levoy, "Real-time 3d model acquisition," in *ACM Transactions on Graphics (TOG)*, vol. 21 (ACM, 2002), pp. 438-446.) proposed a real-time 3D model acquisition method based on a structured light rangefinder and an improved iterative closest point (ICP) algorithm. Compared to previous methods, this method allows users to rotate objects by hand and view a continuously updated model, providing immediate feedback on the presence of scanned surfaces and holes. However, the point cloud obtained by the stripe boundary coding strategy in this method is rather sparse, which makes the 3D data accumulation process inefficient. In addition, the accuracy of its registration method is low, because it skips the traditional instrument-aided coarse registration, and directly performs ICP-based fine registration without good pose estimation, thus reconstructing high-precision 3D registration. Models also require extremely time-consuming post-processing.

SUMMARY OF THE INVENTION

The purpose of the invention is to provide a high-precision dynamic real-time 360° omnidirectional point cloud acquisition method based on fringe projection. Registration and fine registration, without any additional auxiliary equipment, to achieve omnidirectional, unconstrained real-time high-precision 360° point cloud acquisition.

The technical solution for realizing the object of the invention is: a high-precision dynamic real-time 360° omnidirectional point cloud acquisition method based on fringe projection. The steps are as follows:

Step1: Build a quad-camera fringe projection system based on the stereo phase unwrapping method SPU, and complete the system calibration;

Step2: The SPU is used to obtain the absolute phase of the object, so as to realize the acquisition of real-time high-precision 3D data under a single viewing angle of the object;

Step3: In the coarse registration thread, use the scale-invariant feature transformation SIFT method to quickly obtain the 2D matching points of adjacent images, and realize the coarse registration based on the simultaneous localization and mapping (SLAM) technology by solving the "perspective n-point" (PnP) problem, and at the same time quantify the amount of motion of the object during each coarse registration;

Step4: In the fine registration thread, when the accumulated motion amount of the coarse registration reaches a threshold, the fine registration based on the closest point iterative (ICP) method is performed.

Compared with the existing method, the invention has significant advantages: (1) The method proposed by the invention does not rely on any complex and expensive auxiliary registration instruments, and innovatively uses the SLAM technology to realize automatic and fast 3D point cloud coarsening registration. (2) There is no need for the traditional complex preprocessing process based on auxiliary instrument registration and the time-consuming post-processing process to obtain high-precision 3D registration data. The invention proposes a dual-thread parallel processing mechanism from coarse to fine, which can Coarse and fine registration are performed simultaneously in real-time in two separate threads. (3) The point cloud splicing process is real-time, high-precision, and unconstrained. The user can use the method proposed by the invention to directly rotate the measured object arbitrarily by hand, and observe a real-time updated 3D surface shape, which is completed in sequence real-time high-precision omnidirectional 360° point cloud data acquisition.

The invention will be described in further detail below with reference to the accompanying drawings.

DESCRIPTION OF DRAWINGS

FIG. 5(a) is the point cloud result, and FIG. 5(b) is the triangulation result of the point cloud.

FIG. 6(a)-(b) is the measured objects under two different viewing angles. FIG. 6(c)-(d) shows the registration results of point clouds under different viewing angles. FIG. 6(e)-(f) shows the error distribution of the ceramic ball registration results.

DETAILED DESCRIPTION

The high-precision dynamic real-time 360° omnidirectional point cloud acquisition method based on fringe projection of the invention first adopts the stereo phase unwrapping (SPU) technology, without using any additional fringe images or embedded auxiliary patterns, only using a single frequency of three-step phase shift fringes to obtain the absolute phase of the object. At the same time, the invention uses the adaptive depth constraint (ADC) technology to improve the robustness of the phase unwrapping, so as to realize the acquisition of high-precision real-time 3D data under a single viewing angle of the object. Then, on the premise of using the scale invariant feature transform (SIFT) algorithm to obtain the 2D matching points of adjacent images quickly, the invention realizes the simultaneous localization and mapping (SLAM) technology-based map by solving the "perspective n-point" (PnP) problem. Coarse registration. For each coarse registration, the relative motion of the object is quantified by the sum of the two norms of the transformation matrix. After the accumulated motion reaches a certain threshold, the fine registration based on the iterative closest point (ICP) technique is performed. In addition, in order to improve the efficiency of point cloud registration, the invention performs coarse registration and fine registration in parallel in dual threads, so as to realize real-time high-precision 3D point cloud registration.

Figure 1:
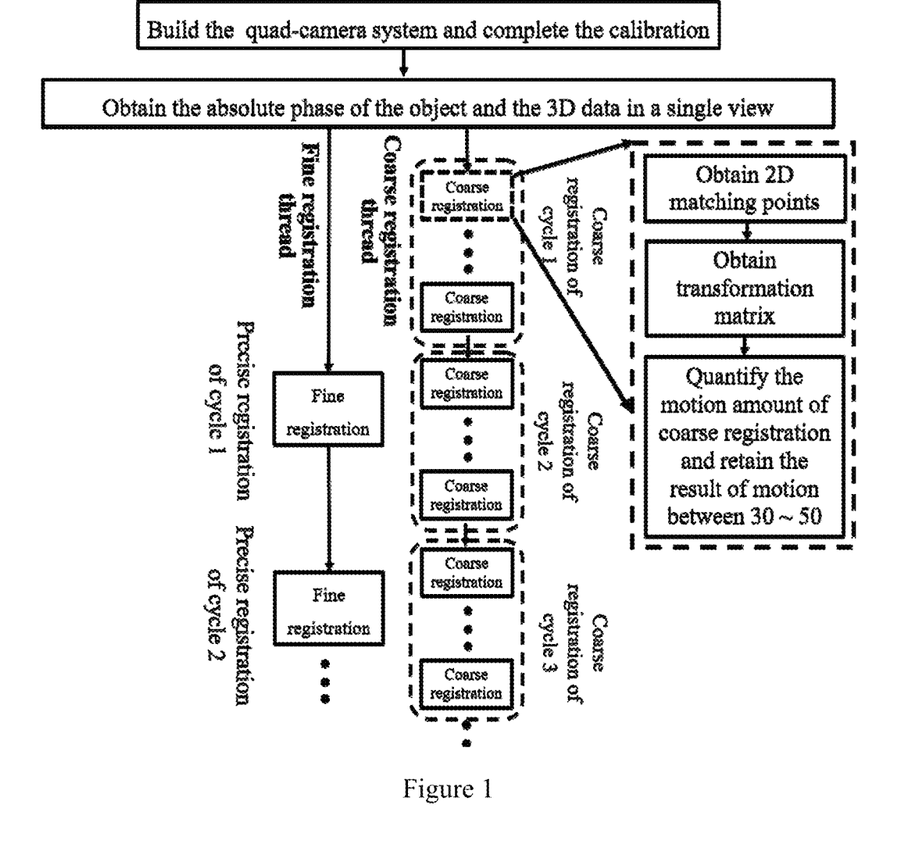
FIG. 1 is a flow chart of the invention.
Figure 2:
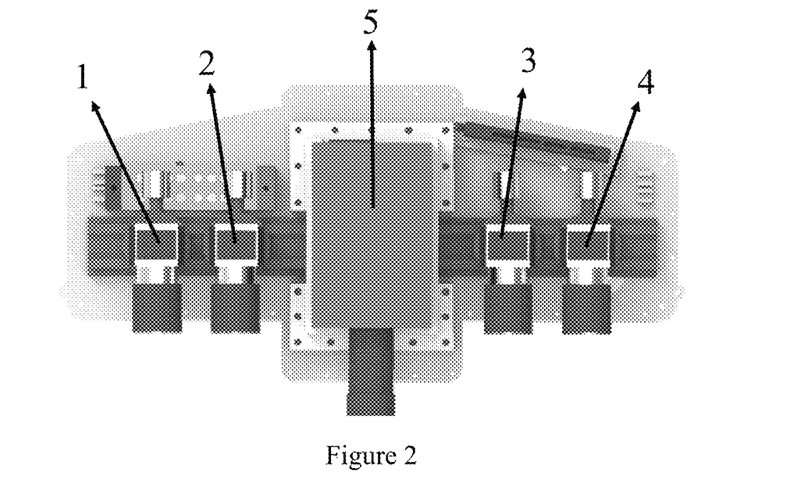
FIG. 2 shows the placement of four cameras and one projector in the constructed quadruple fringe projection system.

The invention is based on a high-precision dynamic real-time 360° omnidirectional point cloud acquisition method based on fringe projection, judges the motion area of the object pixel by pixel through the change of the phase information of the object at two adjacent moments, and implements the Fourier method for the areas of different motion states of the object. The fusion with the phase shift method, the schematic flowchart is shown in FIG. 1, and the implementation steps are as follows:

Step1: Build a quad-camera fringe projection system based on the stereo phase unwrapping method (SPU) to complete the system calibration. The whole system includes a computer, four cameras, and a projector. The projector and the four cameras are connected by four trigger lines, and the four cameras and the computer are connected by four data lines. The specific steps are as follows: First, optimize the positions of the cameras and projectors in the quad-camera fringe projection system. The specific optimization strategy is: the closer the distance between the viewing angles, the less any point on one viewing angle is on the other. The shorter the projected line segment within a certain depth range, and the larger the distance between the two perspectives, the more accurate the 3D reconstruction between the two perspectives (T. Tao, Q. Chen, S. Feng, Y. Hu, M. Zhang, and C. Zuo, "High-precision real-time 3D shape measurement based on a quad-camera system," *Journal of Optics* 20, 014009 (2018)), Optimized components of quadrature fringe projection system The placement position is as follows: the first camera 1 and the projector 5 are kept at a long distance, that is, there is a gap between the first camera 1 and the projector 5 where another camera can be placed; the second camera 2 is placed between the first camera 1 and the projector 5 and is placed close to the first camera 1; the fourth camera 4 and the first camera 1 are placed symmetrically for the projector 5; the third camera 3 and the first camera 1 are placed symmetrically for the projector 5. The placement of the components is shown in FIG. 2. Then use the calibration algorithm of Zhengyou Zhang (Z. Zhang, "A flexible new technique for camera calibration." IEEE Transactions on pattern analysis and machine intelligence. 22(11), 1330-1334 (2000)) to calibrate the entire system to the unified world coordinates, get the internal and external parameters of the four cameras and projectors, and convert these parameters into 2D to 3D, 3D to 2D, and 2D to 2D mapping parameters (K. Liu, Y. Wang, D. L. Lau, et al, "Dual-frequency pattern scheme for high-speed 3-D shape measurement." *Optics express* 18(5): 5229-5244 (2010)).

Step2: Obtain the absolute phase of the object by using the stereo phase unwrapping (SUP) method, and realize the acquisition of real-time high-precision 3D data from a single viewing angle of the object. The specific steps are as follows:

1. The projector 5 projects the patterns, and the cameras capture the images

The projector 5 projects three three-step phase-shifting fringe patterns to the object, and simultaneously triggers four cameras to capture the images. The three-step phase-shifting fringes captured by the first camera 1 can be expressed as:

$$I_1^C(u^C,v^C)=A^C(u^C,v^C)+B^C(u^C,v^C)\cos(\Phi^C(u^C,v^C)).$$

$$I_2^C(u^C,v^C)=A^C(u^C,v^C)+B^C(u^C,v^C)\cos(\Phi^C(u^C,v^C)+2\pi/3),$$

$$I_3^C(u^C,v^C)=A^C(u^C,v^C)+B^C(u^C,v^C)\cos(\Phi^C(u^C,v^C)+4\pi/3),$$

where $(u^C, v^C)$ denotes the coordinates of a pixel point on the first camera 1, $I_1^C$, $I_2^C$, $I_3^C$ denote the three fringe images captured by the camera, $A^C$ is the average light intensity, $B^C$ represents the modulation degree light intensity, and $\Phi^C$ denotes the absolute phase of the fringe images.

2. Obtain the wrapped phase of the object

The wrapped phase of the object is obtained from the three fringe images collected by the first camera 1:

$$\phi^C(u^C, v^C) = \arctan\left(\frac{\sqrt{3}(I_2^C(u^C, v^C) - I_3^C(u^C, v^C))}{2I_1^C(u^C, v^C) - I_2^C(u^C, v^C) - I_3^C(u^C, v^C)}\right),$$

where $\phi^C(u^C, v^C)$ represents the wrapped phase. The relationship between the wrapped phase and the absolute phase is $$\Phi^C(u^C, v^C) = \phi^C(u^C, v^C) + 2k^C(u^C, v^C)\pi, k^C(u^C, v^C) \in [9, N-1]$$

where $k^C$ represents the fringe order, and N represents the number of fringes. The process of calculating the fringe order is called unwrapping.

3. Phase unwrapping

The traditional phase unwrapping method is the temporal phase unwrapping method. Nevertheless, this method needs to project additional auxiliary fringe patterns with different frequencies, which increases the sensitivity of the phase-shifting method to object motion. In order to improve the efficiency of unpacking and reduce the number of fringe images used in a single reconstruction to reduce the sensitivity of the phase shift method to motion, the invention adopts the stereo phase unwrapping method (SPU), and assists with adaptive dynamic depth constraint (ADC) Mechanism, without using any additional auxiliary fringes, the absolute phase of the object can be obtained only through three three-step phase-shifting fringe images. The specific steps are as follows:

(1) Find N 3D candidate points corresponding to a pixel in the first camera 1

For any pixel point $o_{C_1}$ in the first camera 1, there are N possible absolute phases, and the N possible absolute phases can be reconstructed into N 3D candidates by using the 2D to 3D mapping parameters obtained in step1 point. Then some wrong 3D candidate points can be excluded by ADC technology.

(2) Find the 2D candidate points in the second camera 2

Assuming that the number of excluded 3D candidate points is $N_1 (0<N_1<N)$, then the 3D candidate points are projected into the second camera 2 through the 3D to 2D mapping parameters $N_1$ obtained in step1 to obtain the corresponding 2D candidate points $N_1$. There must be a correct matching point among these 2D candidate points, and the correct matching point and $o_{C_1}$ in the first camera 1 should have a similar wrapped phase. Using this feature, the correct matching point can be found through the phase consistency check. However, due to factors such as environmental noise and systematic errors, the above assumptions may not hold, and the wrapped phase of some wrong candidate points may be closer to the wrapped phase of $o_{C_1}$. Therefore, only the 2D candidate points whose phase difference between the wrapped phase and point $o_{C_1}$ is within 0.6 rad are reserved, and other candidate points are excluded.

(3) Find the 2D candidate points in the third camera 3

Assuming that the number of remaining 2D candidate points is $N_2$ $(0<N_2<N_1<N)$, then project these 2D candidate points to the third camera 3 through the 2D to 2D mapping parameters obtained in step1 to obtain corresponding $N_2$ 2D candidates point. These candidate points are then checked for phase consistency with point $o_{C_1}$ in the first camera 1, and candidate points with a phase difference within 0.8 rad are reserved (considering that the distance between the first camera 1 and the third camera 3 is farther than the distance between the first camera 1 and the second camera 2, the accuracy of the projected point is worse, so a larger phase threshold is set. This point will not be repeated hereafter).

(4) Find the 2D candidate points in the fourth camera 4, and determine the phase order of a pixel in the first camera 1

Continue to project the remaining 2D candidate points into the fourth camera 4 for phase consistency check, and retain candidate points with a phase difference within 1 rad. After three rounds of phase consistency checks, the only correct candidate point can be confirmed, and the phase order of point $o_{C_1}$ can also be confirmed.

(5) Obtain the absolute phase of the object and the 3D information under a single viewing angle The absolute phase of the object can be obtained by performing the above operations on each pixel in the first camera 1 in parallel in the computer GPU. Finally, the high-precision 3D topography information of the object under a single viewing angle can be reconstructed through the calibration parameters obtained in step1.

Step3: In the coarse registration thread, the scale invariant feature transform (SIFT) algorithm is used to quickly obtain the 2D matching points of adjacent images, and the coarse registration based on simultaneous localization and mapping (SLAM) technology is achieved by solving the "perspective n-point" (PnP) problem, while quantifying the amount of object motion in each coarse registration. The specific process is as follows:

Point cloud registration includes two processes: coarse registration and fine registration. These two processes need to be performed serially. In order to improve the efficiency of point cloud configuration, the invention proposes a dual-thread parallel mechanism from coarse to fine, which can perform coarse registration and fine registration in parallel in two independent threads. The coarse registration process in the coarse registration thread is described in step3, and the fine registration process in the fine registration thread is described in step4.

1. Find 2D matching points of adjacent images

Assume that two adjacent 3D frames Fram1 and Fram2 have their corresponding 2D texture maps $I^1$ and $I^2$ (texture maps captured by the first camera 1) and 3D data $(x_C^1, y_C^1, z_C^1)$ and $(x_C^2, y_C^2, z_C^2)$ under the coordinate system of the first camera 1; and assume that the current 3D frame is Fram2 and the previous 3D frame is Fram1. First, find and match the feature points of the two frames of texture maps $I^1$ and $I^2$ through the scale-invariant feature transformation SIFT method, and then use the Euclidean distance to eliminate some wrong 2D matching points.

2. Optimize 2D match points

There are still some erroneous matching point pairs in the 2D matching points obtained above, and these erroneous matching points will affect the effect of rough registration, so they should be avoided as much as possible. Therefore, the invention proposes a method for eliminating erroneous matching points by utilizing 3D information, which is specifically as follows:

(1) Calculate the distance from each matching point in Fram1 and Fram2 to all other matching points respectively The 3D matching point set corresponding to the 2D matching points searched by SIFT can be recorded as:

$$P=\{P_1, P_2, \ldots, P_i, \ldots, P_n\}$$

$$Q=\{Q_1, Q_2, \ldots, Q_i, \ldots, Q_n\}$$

where P and Q represent the 3D point sets corresponding to the 2D matching points in Fram1 and Fram2, respectively, and n is the number of matching point pairs, i∈[1,n]. Compute the distance between each $P_i$ and all points in the point set P:

$$H_i(P_i)=\{h_i(P_i,P_1), h_i(P_i,P_2), \ldots, h_i(P_i,P_j), \ldots, h_i(P_i,P_n)\}$$

where $H_i(P_i)$ represents the set of distances between $P_i$ and all points in the point set P, $h_i(P_i,P_j)$ represents the distance between $P_i$ and $P_j$, j∈[1,n]. Similarly, the distance set of $Q_i$ is denoted as $H_i(Q_i)$.

(2) Calculate the difference between the corresponding elements between the two distance sets obtained in step (1)

The difference between the corresponding elements in $H_i(P_i)$ and $H_i(Q_i)$ is then obtained by:

$$D_i = \{D_{i,1}, \ldots, D_{i,j}, \ldots, D_{i,n}\}$$
$$= \{h_i(P_i, P_1) - h_i(Q_i, Q_1), \ldots, h_i(P_i, P_j) - h_i(Q_i, Q_j), \ldots, h_i(P_i, P_n) - h_i(Q_i, Q_n)\}$$

where $D_i$ represents the set of differences between corresponding elements in $H_i(P_i)$ and $H_i(Q_i)$, and $D_{i,j}$ represents the difference between $h_i(P_i,P_j)$ and $h_i(Q_i,Q_j)$.

(3) Further exclude wrong 2D matching points

Then compare the absolute value of each element $D_{i,j}$ in $D_i$ with the size of the threshold $D_{thre}$ ($D_{thre}$ can be 5-6 mm). If the absolute value of $D_i$ is greater than the number of elements in $D_{thre}$ and greater than half of the number of matching points n/2, the point pair C and $Q_i$ is considered unreliable and should be discarded. By this method, false matching point pairs can be basically eliminated.

3. Get the object rotation and translation matrix

After identifying the 2D matching points, the next step is to obtain the rotation and translation matrices between adjacent 3D frames.

Figure 3:
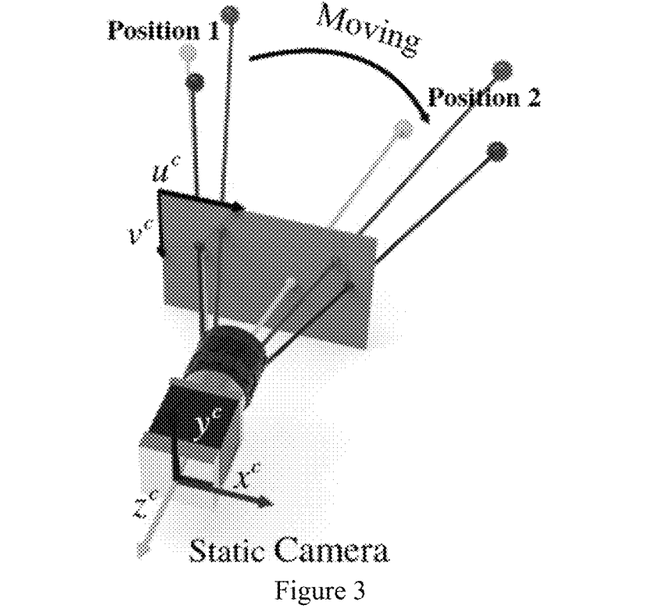
FIG. 3 is a description of the improved PnP problem.

(1) Convert the problem of solving the rotation and translation matrix into a PnP problem In order to obtain the transformation matrix quickly, the invention treats the problem of solving the rotation and translation matrix between adjacent 3D frames as a perspective n-point (PnP) problem. In the invention, the traditional PnP problem is improved, and the improved PnP problem can be described as (as shown in FIG. 3): When the quadruple fringe projection system is stationary and the object moves from position 1 to position 2, the 3D data of the object at position 1 (obtained by step 2) and the 2D matching points between the 2D images captured by the first camera 1 before and after the object moves (obtained by SIFT algorithm and optimized using 3D information) are known, how to obtain the transformed pose of the object, so as to transform the problem of obtaining the rotation and translation matrix of the object into a PnP problem.

(2) Use the EPnP method to solve the PnP problem and obtain the rotation and translation matrices The invention uses the EPnP method to solve the PnP problem. The EPnP method is a non-iterative solution to the PnP problem, which is widely used in visual SLAM systems due to its balance of accuracy and efficiency. Here, the solvePnPRansac function (the function that implements the pose estimation algorithm) that implements the pose estimation algorithm in the OpenCV (an open-source cross-platform computer vision library) language library is directly called. Enter data into this function: the 2D points corresponding to P=$\{P_1, P_2, \ldots, P_i, \ldots, P_n\}$ and Q in $I^2$ and the internal parameter matrix of the first camera 1 (obtained in step1), set the calculation model of the minimum subset of the function as SOLVE_EPnP, and run this function to obtain two adjacent 3D frames between rotation and translation matrices. Then the 3D data $(x_C^1, y_C^1, z_C^1)$ of Fram1 frame is transformed to perform rough registration with the 3D data $(x_C^2, y_C^2, z_C^2)$ of Fram2.

4. Quantify the amount of motion in each coarse registration, and keep the results of the amount of motion between 30-50

The invention then uses the two-norms of the rotation and translation vectors at each coarse registration to quantify the amount of motion of the object at each coarse registration. When the motion amount is less than 30, considering the data redundancy caused by the motion amount being too small, discard the result of this coarse registration and execute the next coarse registration; When the motion amount is greater than 50, considering the excessive registration error, coarse registration will no longer be performed, unless this condition is satisfied (that is, the user rotates the object back to a position where the amount of motion from the last valid 3D frame is between 30 and 50). When this condition is satisfied, the coarse registration will continue.

Step4: In the fine registration thread, when the accumulated motion amount of the coarse registration reaches a certain threshold, the fine registration based on the iterative closest point algorithm (ICP) is performed. The specific details are as follows:

After coarse registration, fine registration is performed using the ICP algorithm. ICP is the main method for aligning 3D models when the initial pose estimation between two viewpoints is known. However, due to iterative operations, the process of ICP is time-consuming and is not suitable for real-time scenarios. In order to improve the registration efficiency and reduce the accumulation of registration errors, the invention proposes a dual-thread parallel processing mechanism, which can simultaneously perform SLAM-based coarse registration (step3) and ICP-based fine registration (step4) in two separate threads, and only one fine registration is performed after multiple coarse registrations are performed. Specific steps are as follows:

1. Compare the cumulative motion of coarse registration and the size of the motion threshold to determine whether fine registration can be performed It is determined whether the accumulated motion of the effective coarse registration in step3 has reached the motion threshold 200. Only when the accumulated motion amount reaches the threshold of 200, the ICP-based fine registration will be performed in the fine registration thread, and the fine registration will be performed using the time of multiple coarse registrations in the next cycle, that is, the fine registration is performed simultaneously with the multiple coarse registrations in the next cycle.

2. Perform fine registration

In addition, in order to further improve the efficiency of fine registration, the invention firstly downsamples the 3D point cloud that has been roughly registered, and then uses the ICP algorithm to process the downsampled data. After obtaining the accurate transformation matrix, operate the original dense 3D point cloud data, and finally complete the fine 3D registration:

(1) Downsampling the 3D point cloud that has been coarsely registered

The invention uses the voxelized grid method to downsample the point cloud, divides the two pieces of 3D point cloud data after rough registration into multiple 3D voxel grids, and uses the center of gravity of the points in each voxel grid as the downsampling value. After downsampling, the 3D point cloud set in Fram1 can be represented as $(x_{down}^1, y_{down}^1, z_{down}^1)$, and the 3D point cloud set in Fram2 can be represented as $(x_{down}^2, y_{down}^2, z_{down}^2)$.

(2) The ICP algorithm is used to process the downsampled data to obtain an accurate transformation matrix The ICP method is one of the most common methods for aligning 3D models when the initial pose estimates between the two views are known. After downsampling the point cloud data, the first step is to find the nearest point corresponding to each point in the point set $(x_{down}^1, y_{down}^1, z_{down}^1)$ in point set $(x_{down}^2, y_{down}^2, z_{down}^2)$; The second step is to obtain the rigid body transformation that minimizes the average distance between the corresponding point pairs obtained in the first step, and obtain the rotation and translation matrices corresponding to the rigid body transformation; The third step, use the rotation and translation matrix obtained in the second step to transform $(x_{down}^1, y_{down}^1, z_{down}^1)$, and obtain a new point cloud set, and record the newly obtained point cloud set as $(x_{down}^{1\_new}, y_{down}^{1\_new}, z_{down}^{1\_new})$; The fourth step, if the new point cloud sets $(x_{down}^{1\_new}, y_{down}^{1\_new}, z_{down}^{1\_new})$ and $(x_{down}^2, y_{down}^2, z_{down}^2)$ satisfy the average distance between the two point sets is less than 0.01, stop the calculation, otherwise use $(x_{down}^{1\_new}, y_{down}^{1\_new}, z_{down}^{1\_new})$ as the new $(x_{down}^1, y_{down}^1, z_{down}^1)$ to continue the above steps iteratively, unless one of the following two conditions is satisfied: (1) The average distance between the new transformed point sets $(x_{down}^{1\_new}, y_{down}^{1\_new}, z_{down}^{1\_new})$ and $(x_{down}^2, y_{down}^2, z_{down}^2)$ is less than 0.01; (2) The total number of iterations reaches 10 times. After several iterations are performed and one of the above two iteration termination conditions is reached, the ICP is terminated, and the rotation and translation matrices obtained in the last iteration are the transformation matrices required for fine registration. After obtaining the transformation matrix of the precise registration, the original dense 3D point cloud data is transformed, and finally the precise 3D registration is completed.

Examples

To verify the effectiveness of the invention, a quad-camera fringe projection system is constructed, which includes a LightCrafter 4500Pro projector and four Basler acA640-750 um cameras (resolution 640×480) for SPU unwrapping. Using HP Z230 computer (Intel Xeon E3-1226 v3 CPU, NVIDIA Quadro K2200 GPU), and based on programming languages such as OpenCV and PCL, the algorithm proposed by the invention is developed. In the experiment, the speed of the projector is 100 Hz, and all cameras are triggered by the projector. The imaging speed of the built system is 45 Hz, and the single scan accuracy is 45 microns.

Figure 4:
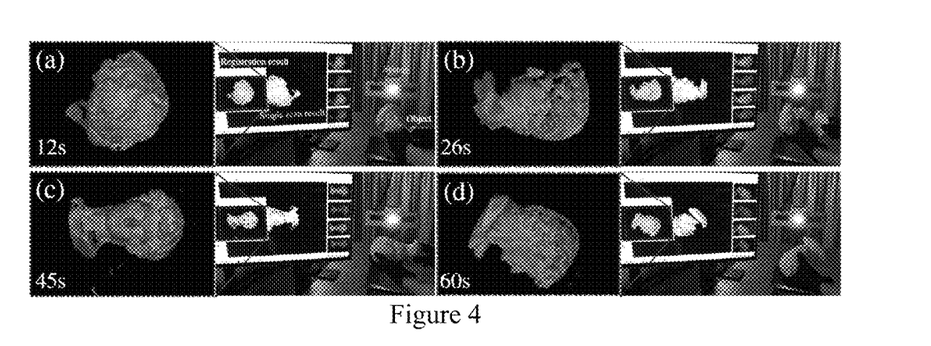
FIG. 4 is the scene and result of measuring the arbitrarily rotated David model at different times using the method proposed by the invention.
Figure 5:
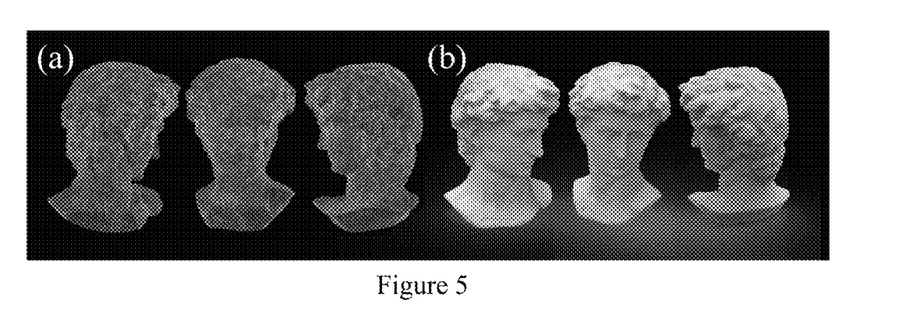
FIG. 5 is the complete David model measured by the method proposed by the invention.

In the first experiment, a plaster David model was arbitrarily and unconstrainedly rotated and real-time 360° omnidirectional modeling was achieved. FIG. 4 shows the point cloud registration scenarios and results at different periods. The time for a single coarse registration and fine registration is 0.4 seconds and 2 seconds, respectively. The reconstruction time for the entire model is 70 seconds. FIG. 5 shows the registered omnidirectional 360° 3D model, in which FIG. 5(a) is the result of the acquired complete point cloud, and FIG. 5(b) is the triangulation result of the point cloud. It can be seen that all the 3D topography of David's model has been reconstructed, and the first and last point clouds are well aligned. This experiment shows that the method proposed in the invention can obtain high-quality 360° models of hand-held objects in real time.

Figure 6:
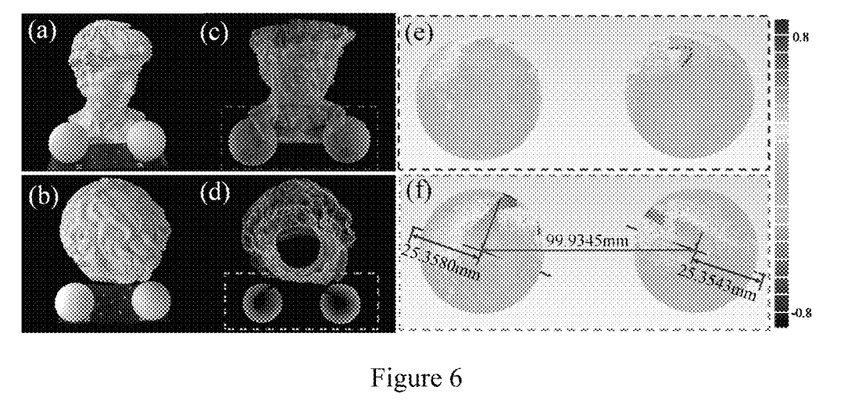
FIG. 6 shows the results of the David model and ceramic balls measured by the method proposed by the invention.

In the second experiment, two ceramic balls with radii of 25.3989 mm and 25.4038 mm and a center-to-center distance of 100.0532 mm were measured. Since the sphere has no 2D features, it is necessary to complete the point cloud registration with the help of the David model with complex 2D features. Rotate the David model with the ceramic ball to achieve real-time registration of the ceramic ball. The experimental results are shown in FIG. 6, in which FIG. 6(a)-(b) is the measured objects under two different viewing angles, and FIG. 6(c)-(d) is the point cloud registration results under different viewing angles. Fit the measured sphere, and the error distribution between the fitted sphere and the measured sphere data are shown in FIG. 6(e) and FIG. 6(f). The radii of the entire reconstructed sphere are 25.3580 mm and 25.3543 mm, and the deviations are 40.9 μm and 49.5 μm, respectively. The measured center distance is 99.9345 mm, and the error is 118.7 μm. This experiment shows that the overall accuracy of the complete 3D model reconstructed by the method proposed in the invention can reach a high precision level of hundreds of microns, which makes it possible for the method proposed in this invention to be used in 360° industrial surface defect detection and other fields.

The invention claimed is:

1. A high-precision dynamic real-time 360-degree omnidirectional point cloud acquisition method based on fringe projection, comprising the steps of:
   step_1: building a quad-camera fringe projection system based on a stereo phase unwrapping (SPU) method, and completing a system calibration;
   step_2: obtaining an absolute phase of an object, so as to realize an acquisition of real-time high-precision 3D data under a single viewing angle of the object;
   step_3: in a coarse registration thread, using a scale-invariant feature transformation (SIFT) method to obtain 2D matching points of adjacent images, and realizing the coarse registration based on a simultaneous localization and mapping (SLAM) technology by solving a "perspective n-point" (PnP) problem, and at the same time quantifying an amount of motion of the object during each coarse registration; and
   step_4: in a fine registration thread, in response to an accumulated motion amount of the coarse registration reaching a threshold, performing a fine registration based on a closest point iterative (ICP) method,
   wherein the step 2 further comprises the sub-steps of:
      projecting, by a projector, three-step phase-shifting fringe patterns to the object and simultaneously capturing three-step phase-shifting fringe images by using a plurality of cameras;
      obtaining a wrapped phase of the object from three-step phase-shifting fringe images captured by a first camera of the plurality of cameras; and
      obtaining the absolute phase of the object only through three-step phase-shifting fringe images captured by the plurality of cameras,
   wherein the step 3 further comprises the sub-steps of:
      finding the 2D matching points of the adjacent images by assuming two adjacent 3D frames;

optimizing the 2D matching points by using 3D information;

obtaining rotation and translation matrices between adjacent 3D frames; and quantifying an amount of motion in each coarse registration, and wherein the step 4 further comprises the sub-steps of:

comparing a cumulative motion of coarse registration and a size of a motion threshold to determine whether the fine registration can be performed; and performing the fine registration.

2. The method according to claim 1, wherein the quad-camera fringe projection system includes a computer, four cameras, and a projector; the projector and the four cameras are connected by four trigger lines, and the four cameras and the computer are connected by four data lines, wherein the first camera and the projector are kept at a long distance, there is a gap between the first camera and the projector where another camera is placed; the second camera is placed between the first camera and the projector and is placed close to the first camera; the fourth camera and the first camera are placed symmetrically for the projector; the third camera and the first camera are placed symmetrically for the projector, and wherein the step 1 further comprises calibrating the entire system to unified world coordinates, obtaining internal and external parameters of the four cameras and projectors, and converting the internal and external parameters into 2D to 3D, 3D to 2D, and 2D to 2D mapping parameters.

3. The method according to claim 2, wherein the step 2 comprise the substeps of:

(1) projecting three three-step phase-shifting fringe patterns to the object by the projector, and simultaneously triggering the four cameras to capture the images wherein three-step phase-shifting fringes captured by the first camera is expressed as:

$$I_1^C(u^C,v^C)=A^C(u^C,v^C)+B^C(u^C,v^C)\cos(\Phi^C(u^C,v^C)),$$

$$I_2^C(u^C,v^C)=A^C(u^C,v^C)+B^C(u^C,v^C)\cos(\Phi^C(u^C,v^C)+2\pi/3),$$

$$I_3^C(u^C,v^C)=A^C(u^C,v^C)+B^C(u^C,v^C)\cos(\Phi^C(u^C,v^C)+4\pi/3),$$

where $(u^C, v^C)$ denotes coordinates of a pixel point on the first camera, $I_1^C, I_2^C, I_3^C$ denote the three fringe images captured by the first camera, $A^C$ is an average light intensity, $B^C$ represents a modulation degree light intensity, and $\Phi^C$ denotes an absolute phase of the fringe images;

(2) obtaining the wrapped phase of the object from the three fringe images collected by the first camera according to:

$$\phi^C(u^C, v^C) = \arctan\left(\frac{\sqrt{3}\left(I_2^C(u^C, v^C)-I_3^C(u^C, v^C)\right)}{2I_1^C(u^C, v^C)-I_2^C(u^C, v^C)-I_3^C(u^C, v^C)}\right),$$

where $\phi^C(u^C, v^C)$ represents the wrapped phase, wherein a relationship between the wrapped phase and the absolute phase is $$\Phi^C(u^C,v^C)=\phi^C(u^C,v^C)+2k^C(u^C,v^C)\pi, k^C(u^C,v^C)\epsilon[9,N-1]$$

where $k^C$ represents a fringe order, and N represents a number of fringes;

(3) performing a phase unwrapping by obtaining the absolute phase of the object only through three three-step phase-shifting fringe images, comprising the following steps:

(a) finding N 3D candidate points corresponding to a pixel in the first camera, wherein for any pixel point $o_{C_1}$ in the first camera, there are N possible absolute phases, and the N possible absolute phases are reconstructed into N 3D candidates by using the 2D to 3D mapping parameters obtained in the step_1 so that wrong 3D candidate points is excluded by ADC technology;

(b) finding the 2D candidate points in the second camera by assuming that a number of excluded 3D candidate points is_$N_1(0<N_1<N)$, then projecting the 3D candidate points into the second camera through the 3D to 2D mapping parameters_$N_1$_obtained in the step_1 to obtain the corresponding 2D candidate points_$N_1$;

(c) finding the 2D candidate points in the third camera by assuming that a number of remaining 2D candidate points is $N_2$ $(0<N_2<N_1<N)$, then projecting the 2D candidate points to the third camera through the 2D to 2D mapping parameters obtained in the step_1 to obtain corresponding $N_2$ 2D candidates point, checking candidate points for phase consistency with point $o_{C_1}$ in the first camera, and reserving the candidate points with a phase difference within 0.8_rad;

(d) finding the 2D candidate points in the fourth camera, and determine the phase order of a pixel in the first camera by continuing to project the remaining 2D candidate points into the fourth camera for phase consistency check, and retaining candidate points with a phase difference within 1 rad; wherein after three rounds of phase consistency checks, the only correct candidate point is confirmed, and the phase order of point $o_{C_1}$ is also confirmed; and (e) obtaining the absolute phase of the object and the 3D information under a single viewing angle by performing the above operations on each pixel in the first camera in parallel in the computer GPU; and reconstructing the high-precision 3D topography information of the object under a single viewing angle through the calibration parameters obtained in the step_1.

4. The method according to claim 1, wherein the step 3 comprises the substeps of:

(1) finding 2D matching points of adjacent images by assuming that two adjacent 3D frames Fram1 and Fram2 have their corresponding 2D texture maps $I^1$ and $I^2$ and 3D data $(x_C^1, y_C^1, z_C^1)$ and $(x_C^2, y_C^2, z_C^2)$ under the coordinate system of the first camera; assuming that the current 3D frame is Fram2 and the previous 3D frame is Fram1; finding and matching the feature points of the two frames of texture maps $I^1$ and $I^2$ through a scale-invariant feature transformation SIFT method; and then using an Euclidean distance to eliminate some wrong 2D matching points;

(2) optimizing 2D match points by using 3D information corresponding to 2D matching points to eliminate the wrong matching points, comprising the steps of:

(a) calculating a distance from each matching point in Fram1 and Fram2 to all other matching points respectively, wherein the 3D matching point set corresponding to the 2D matching points searched by SIFT is recorded as:

$$P=\{P_1,P_2,\ldots,P_i,\ldots,P_n\}$$

$$Q=\{Q_1,Q_2,\ldots,Q_i,\ldots,Q_n\}$$

where P and Q represent the 3D point sets corresponding to the 2D matching points in Fram1 and Fram2, respectively, and n is the number of matching point pairs, $i \in [1,n]$; and computing a distance between each $P_i$ and all points in the point set P:

$$H_i(P_i)=\{h_i(P_i,P_1), h_i(P_i,P_2), \ldots, h_i(P_i,P_j), \ldots, h_i(P_i,P_n)\}$$

where $H_i(P_i)$ represents the set of distances between $P_i$ and all points in the point set P, $h_i(P_i,P_j)$ represents the distance between $P_i$ and $P_j$, $j \in [1,n]$; and the distance set of $Q_i$ is denoted as $H_i(Q_i)$;

(b) calculating a difference between the corresponding elements between the two distance sets obtained in the step (1), wherein a difference between the corresponding elements in $H_i(P_i)$ and $H_i(Q_i)$ is then obtained by:

$$D_i=\{D_{i,1}, \ldots, D_{i,j}, \ldots, D_{i,n}\}$$
$$=\{h_i(P_i,P_1)-h_i(Q_i,Q_1), \ldots, h_i(P_i,P_j)-h_i(Q_i,Q_j), \ldots, h_i(P_i,P_n)-h_i(Q_i,Q_n)\}$$

where $D_i$ represents a set of differences between corresponding elements in $H_i(P_i)$ and $H_i(Q_i)$, and $D_{i,j}$ represents a difference between $h_i(P_i,P_j)$ and $h_i(Q_i,Q_j)$;

(c) further excluding wrong 2D matching points by comparing the absolute value of each element $D_{i,j}$ in $D_i$ with a size of a threshold $D_{thre}$ wherein in response to the absolute value of $D_i$ being greater than the number of elements in $D_{thre}$ and greater than half of the number of matching points n/2, the point pair C and $Q_i$ is considered unreliable and is discarded, such that false matching point pairs are eliminated;

(3) obtaining an object rotation and translation matrix between adjacent 3D frames after identifying the 2D matching points by:
(a) converting a problem of solving the rotation and translation matrix into a PnP problem;
(b) using an EPnP method to solve the PnP problem and obtaining the rotation and translation matrices; and
(4) quantifying the amount of motion in each coarse registration, and keeping results of an amount of motion between 30-50.

5. The method according to claim 1, wherein the step 4 comprises the substeps of:
(1) comparing a cumulative motion of coarse registration and a size of a motion threshold to determine whether fine registration can be performed by determining whether the accumulated motion of the effective coarse registration in the step_3 has reached the motion threshold 200; only when the accumulated motion amount reaches the threshold of 200, performing a ICP-based fine registration in a fine registration thread, and performing the fine registration using the time of multiple coarse registrations in the next cycle;

(2) performing fine registration by downsampling
the 3D point cloud that has been roughly registered, using an ICP algorithm to process the downsampled data; after obtaining the accurate transformation matrix, operating an original dense 3D point cloud data, and finally completing the fine 3D registration by:
(a) downsampling the 3D point cloud that has been coarsely registered by
using a voxelized grid method to downsample the point cloud, dividing the two pieces of 3D point cloud data after rough registration into multiple 3D voxel grids, and using the center of gravity of the points in each voxel grid as the downsampling value, wherein after downsampling, the 3D point cloud set in Fram1 is represented as $(x_{down}^1, y_{down}^1, z_{down}^1)$, and the 3D point cloud set in Fram2 is represented as $(x_{down}^2, y_{down}^2, z_{down}^2)$;
(b) using the ICP algorithm is used to process the downsampled data to obtain an accurate transformation matrix by:
a first step of after downsampling the point cloud data, finding the nearest point corresponding to each point in the point set $(x_{down}^1, y_{down}^1, z_{down}^1)$ in point set $(x_{down}^2, y_{down}^2, z_{down}^2)$;
a second step of obtaining the rigid body transformation that minimizes the average distance between the corresponding point pairs obtained in the first step, and obtaining the rotation and translation matrices corresponding to the rigid body transformation;
a third step of using the rotation and translation matrix obtained in the second step to transform $(x_{down}^1, y_{down}^1, z_{down}^1)$, obtaining a new point cloud set, and recording the newly obtained point cloud set as $(x_{down}^{1\_new}, y_{down}^{1\_new}, z_{down}^{1\_new})$;
a fourth step of in response to the new point cloud sets $(x_{down}^{1\_new}, y_{down}^{1\_new}, z_{down}^{1\_new})$ and $(x_{down}^2, y_{down}^2, z_{down}^2)$ satisfying an average distance between the two point sets being less than 0.01, stopping the calculation, otherwise using $(x_{down}^{1\_new}, y_{down}^{1\_new}, z_{down}^{1\_new})$ as the new $(x_{down}^1, y_{down}^1, z_{down}^1)$ to continue the above steps iteratively, unless one of the following two conditions is satisfied: (1) the average distance between the new transformed point sets $(x_{down}^{1\_new}, y_{down}^{1\_new}, z_{down}^{1\_new})$ and $(x_{down}^2, y_{down}^2, z_{down}^2)$ is less than 0.01; (2) the total number of iterations reaches 10 times, wherein after several iterations are performed and one of the above two iteration termination conditions is reached, the ICP is terminated, and the rotation and translation matrices obtained in the last iteration are the transformation matrices required for fine registration; after obtaining the transformation matrix of the precise registration, the original dense 3D point cloud data is transformed, and finally the precise 3D registration is completed.

* * * * *